United States Patent [19]

Staehle

[11] Patent Number: 4,607,329

[45] Date of Patent: Aug. 19, 1986

[54] CIRCUIT ARRANGEMENT FOR THE TEMPORARY STORAGE OF INSTRUCTION WORDS

[75] Inventor: Peter Staehle, Paderborn-Dahl, Fed. Rep. of Germany

[73] Assignee: Nixdorf Computer AG, Fed. Rep. of Germany

[21] Appl. No.: 581,273

[22] Filed: Feb. 17, 1984

[30] Foreign Application Priority Data

Feb. 18, 1983 [DE] Fed. Rep. of Germany ....... 3305693

[51] Int. Cl.[4] ............................................... G06F 9/06
[52] U.S. Cl. ................................................. 364/200
[58] Field of Search ... 364/200 MS File, 900 MS File

[56] References Cited

U.S. PATENT DOCUMENTS 4,079,455 3/1978 Ozga ..................................... 364/200
4,255,785 3/1981 Chamberlin .......................... 364/200

Primary Examiner—Raulfe B. Zache
Attorney, Agent, or Firm—Krass & Young

[57] ABSTRACT

For the temporary storage of instruction words read out of an instruction memory, an arrangement is used of one of a plurality of buffer memories (20 to 23) which are addressed for writing in and for reading out by a cyclically operating write counter (26) and a cyclically operating read counter (27). A monitoring circuit (28) controlling both counters (26,27) prevents the write counter (26) from overtaking the read counter (27).

5 Claims, 5 Drawing Figures

| INPUT | | | OUTPUT | |
|---|---|---|---|---|
| IFLOC | WRITE COUNTER 26 | READ COUNTER 27 | PUVOL | FREIG |
| 0. | 0. | 0 | 0 | 0 |
| 0. | 0. | 1 | 1 | 1 |
| 0. | 0. | 2 | 1 | 1 |
| 0. | 0. | 3 | 1 | 1 |
| 0. | 0. | 4 | 0 | 1 |
| : | : | : | : | : |
| 0. | 0. | 15 | 0 | 1 |
| 0. | 1. | 0 | 0 | 1 |
| 0. | 1. | 1 | 0 | 0 |
| 0. | 1. | 2 | 1 | 1 |
| 0. | 1. | 3 | 1 | 1 |
| 0. | 1. | 4 | 1 | 1 |
| 0. | 1. | 5 | 0 | 1 |
| : | : | : | : | : |
| 0. | 1. | 15 | 0 | 1 |
| 0. | 2. | 0 | 0 | 1 |
| 0. | 2. | 1 | 0 | 1 |
| 0. | 2. | 2 | 0 | 0 |
| 0. | 2. | 3 | 1 | 1 |
| 0. | 2. | 4 | 1 | 1 |
| 0. | 2. | 5 | 1 | 1 |
| 0. | 2. | 6 | 0 | 1 |
| : | : | : | : | : |
| 0. | 2. | 15 | 0 | 1 |
| 0. | 3. | 0 | 0 | 1 |
| 0. | 3. | 1 | 0 | 1 |
| 0. | 3. | 2 | 0 | 1 |
| 0. | 3. | 3 | 0 | 0 |
| 0. | 3. | 4 | 1 | 1 |
| 0. | 3. | 5 | 1 | 1 |
| 0. | 3. | 6 | 1 | 1 |
| 0. | 3. | 7 | 0 | 1 |
| : | : | : | : | : |
| 0. | 3. | 15 | 0 | 1 |

| INPUT | | | OUTPUT | |
|---|---|---|---|---|
| IFLOC | WRITE COUNTER 26 | READ COUNTER 27 | PUVOL | FREIG |
| 1. | 0. | 0 | 0 | 0 |
| 1. | 0. | 1 | 1 | 1 |
| 1. | 0. | 2 | 1 | 1 |
| 1. | 0. | 3 | 1 | 1 |
| 1. | 0. | 4 | 0 | 1 |
| : | : | : | : | : |
| 1. | 0. | 14 | 0 | 1 |
| 1. | 0. | 15 | 0 | 0 |
| 1. | 1. | 0 | 0 | 0 |
| 1. | 1. | 1 | 0 | 0 |
| 1. | 1. | 2 | 1 | 1 |
| 1. | 1. | 3 | 1 | 1 |
| 1. | 1. | 4 | 1 | 1 |
| 1. | 1. | 5 | 0 | 1 |
| : | : | : | : | : |
| 1. | 1. | 15 | 0 | 1 |
| 1. | 2. | 0 | 0 | 1 |
| 1. | 2. | 1 | 0 | 0 |
| 1. | 2. | 2 | 0 | 0 |
| 1. | 2. | 3 | 1 | 1 |
| 1. | 2. | 4 | 1 | 1 |
| 1. | 2. | 5 | 1 | 1 |
| 1. | 2. | 6 | 0 | 1 |
| : | : | : | : | : |
| 1. | 2. | 15 | 0 | 1 |
| 1. | 3. | 0 | 0 | 1 |
| 1. | 3. | 1 | 0 | 1 |
| 1. | 3. | 2 | 0 | 0 |
| 1. | 3. | 3 | 0 | 0 |
| 1. | 3. | 4 | 1 | 1 |
| 1. | 3. | 5 | 1 | 1 |
| 1. | 3. | 6 | 1 | 1 |
| 1. | 3. | 7 | 0 | 1 |
| : | : | : | : | : |
| 1. | 3. | 15 | 0 | 1 |

FIG. 5

CIRCUIT ARRANGEMENT FOR THE TEMPORARY STORAGE OF INSTRUCTION WORDS

TECHNICAL FIELD

The invention relates to a circuit arrangement for the temporary storage of instruction words which are read out of the memory of a data processing unit and are then processed within the course of execution of an instruction, with a temporary memory arrangement which permits the reading out of instruction words at the same time as the execution of instruction words read out previously.

DISCLOSURE OF THE INVENTION

In a data processing unit, instruction words are read out of an instruction memory according to a sequence prescribed by a program and they then cause the execution of the data processing operations prescribed by their information content. The capacity of a data processing unit depends substantially on the speed at which the instruction words can be read out of the instruction memory when the processing time of the instruction words is shorter than the time for access to the instruction memory. It is known that the reading out of instruction words requires the major portion of the operating time of a data processing unit, since more instruction words are read out and processed than operands. Therefore in the course of the development of data processing technology an acceleration of the instruction accesses was striven for, which essentially led to two operating principles, which however have respective disadvantages.

Thus for example in the instruction temporary memory the so-called FIFO (first in, first out) principle is used by which an instruction word can be read out of the instruction memory while a previous instruction is still being accomplished. This principle can also be used in parallel and multiple form. But on the one hand this is expensive to put in practice and on the other hand it is relatively slow despite the possibility that a processor can quickly gain access to a FIFO memory. This is attributable to the fact that a FIFO memory, similarly to a shift register, must shift the information stored in it through its memory area before it can be delivered at its output.

Another possibility for accelerating the instruction accesses consists in providing a memory hierarchy between the instruction memory and the computer or processor executing the instructions, which hierarchy is composed of temporary memories which permit a particularly rapid access and in which smaller blocks of connected instruction words can be stored. The circuit technology required for such a memory hierarchy is very expensive, and a very rapidly operating and therefore expensive storage medium is necessary.

The invention is based on the problem of achieving the acceleration of information accesses with a tolerable increase in circuit technology complexity and of avoiding waiting times in the computer or processor of a data processing unit by the simplest possible measures.

This problem is solved, for a circuit arrangement of the type mentioned at the start, according to the invention, by having one or more buffer memories provided as a temporary memory arrangement, which memories are addressed for writing in and for reading out by a cyclically operating write counter and a cyclically operating read counter, and that the write counter and the read counter respectively deliver output signals to a monitoring circuit which prevents the read counter from being overtaken by the write counter.

The invention thus provides, as temporary memories, relatively simple and inexpensive buffer memories in which, with a suitable size of memory volume, more instruction words can be written in. This writing in and also the reading out of instruction words is respectively controlled by a counter which addresses the buffer memory arrangement. The two counters can thus be designated as write counter and as read counter. During the addressing operation, with each counting step they give an output signal to a monitoring circuit which prevents the write counter from overtaking the read counter, which would mean that the write counter addresses a memory location of the buffer memory arrangement for writing in an instruction word at which location an instruction word is already present which is to be accomplished, i.e. read out for a calculator or processor.

Such a circuit arrangement operates analogously to a FIFO memory, since the instruction words written in do not first have to be pushed through the buffer memory before they can be read out at an output. On the contrary, the instruction words can be called up again by simple addressing immediately after they are written in, so that a considerably less expensive construction together with a notable acceleration of operation are offered as compared with a FIFO memory. This is especially important for carrying out jump instructions.

With a circuit arrangement according to the invention, an almost complete separation of the reading out of instruction words form the instruction memory from their processing in the connected computer or processor is achieved. For this reason the reading out of instruction words can also be brought about with the aid of an auxiliary computer which has to be synchronized by a main computer only when the linear instruction run prescribed by a program is interrupted, for example by a jump instruction or by an access to an operand.

Only seven integrated circuits are required for storing 16 instruction words each of them 16 bits in length for an embodiment example, yet to be described, of a circuit arrangement according to the invention.

BEST MODE FOR CARRYING OUT THE INVENTION

Figure 1:
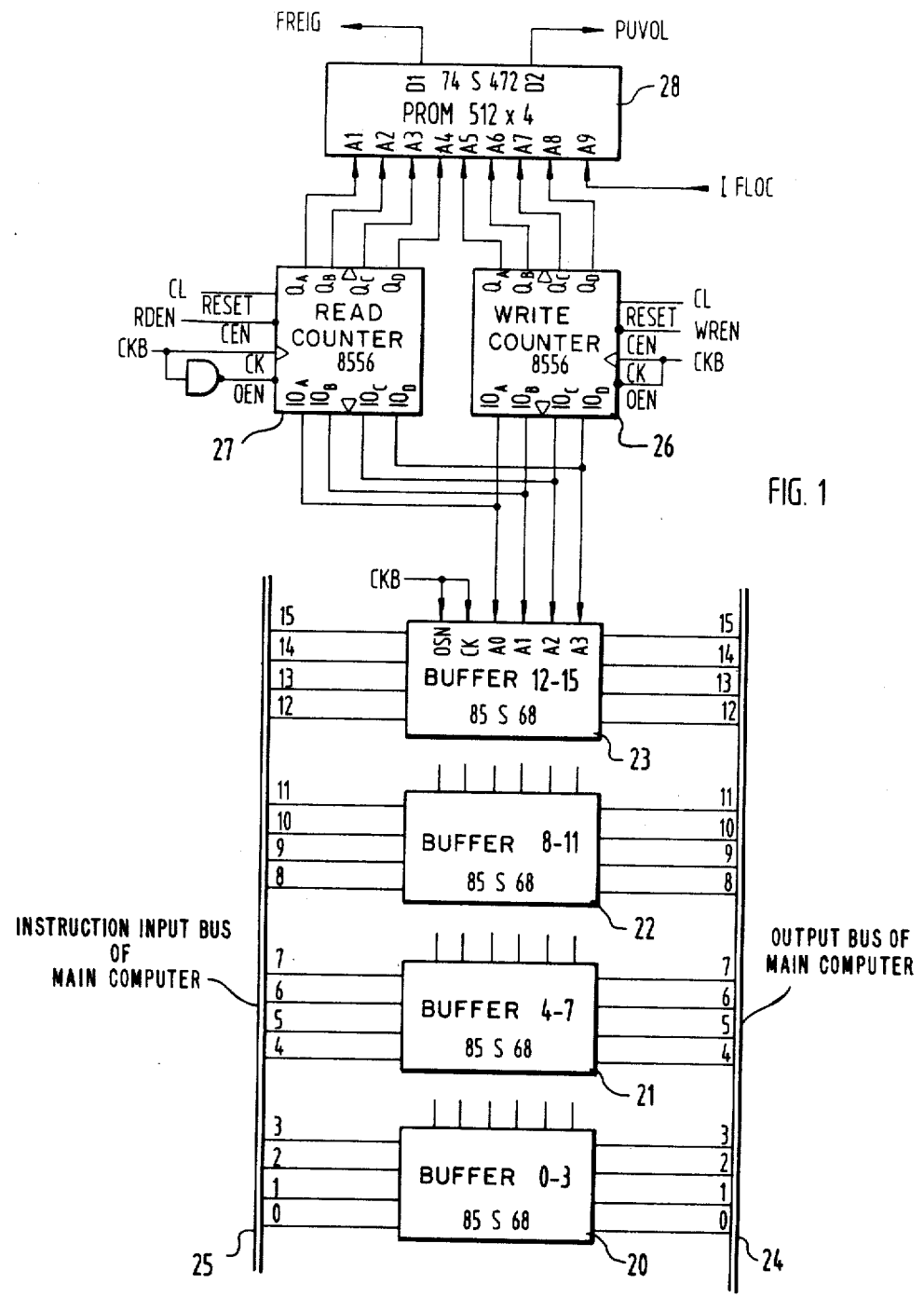
FIG. 1 shows an embodiment example of the invention for instruction words 16 bits in length.

In FIG. 1 four integrated circuits 20 to 23 of the 85568 type are represented as a buffer memory arrangement, the inputs of which circuits are connected with the output bus 24 of an instruction memory, for example the main memory of a data processing unit. Their outputs are connected with the instruction input 25 of the main computer of the data processing unit. The integrated circuits in the embodiment example represented each consist of 16 registers with a width of 4 bits each, so that therefore instruction words with a length of 16 bits can be stored in this arrangement. Accordingly the input lines to the circuits 20 to 23 are designated as 0 to 15. The similarly designated outputs are energized on the address inputs A0 to A3 of the respective register addressed as a function of the addressing of the integrated circuits 20 to 23.

The read counter 27 and the write counter 26, with each clock signal CKB fed to them at their inputs CK cyclically energize, one after another, the address lines of the integrated circuits 20 to 23 of the buffer memory arrangement.

Figure 3:
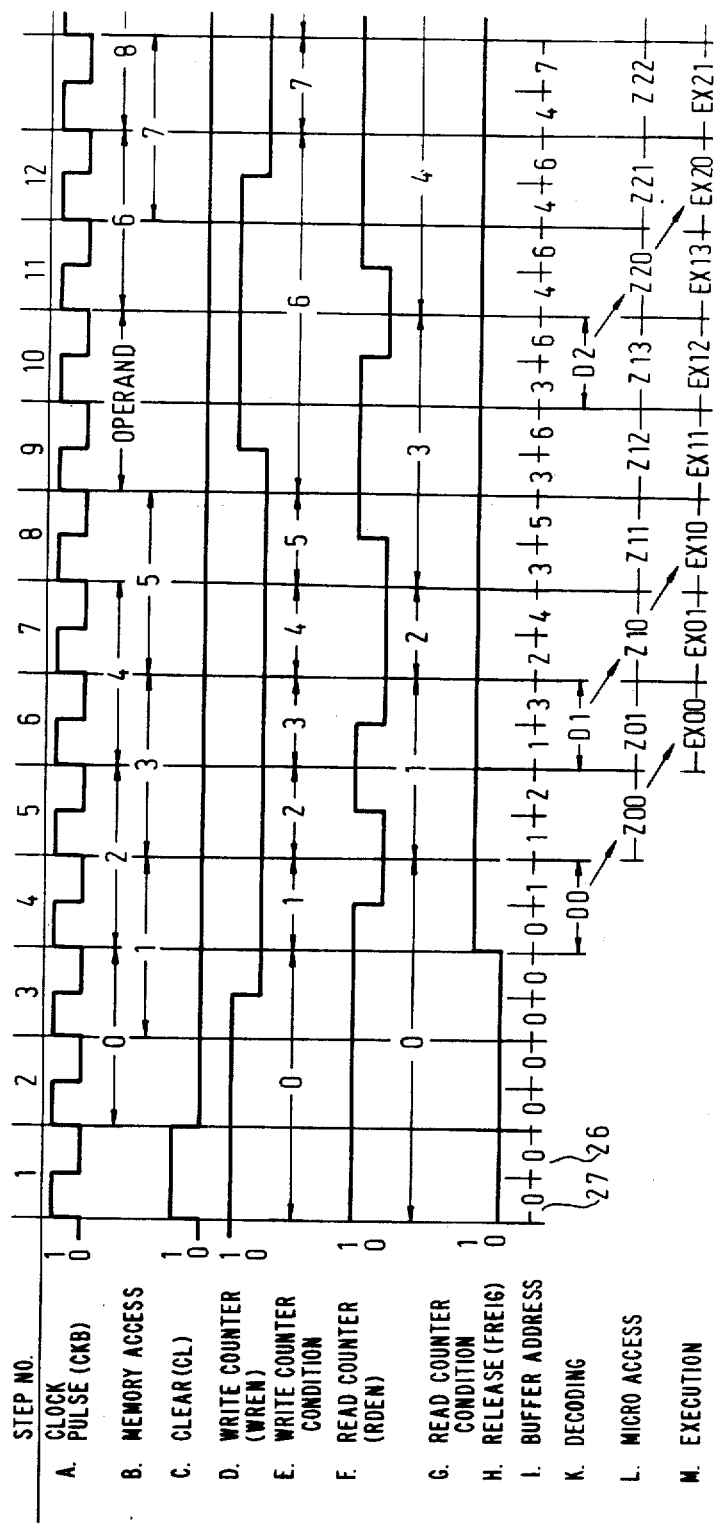
FIG. 3 shows the time sequence of signals for initiating temporary storage after the execution of a jump instruction.

In the first half of the clock pulse of the signal CKB (CKB=1) the read counter 27 addresses the respective register to be read. In the second half of the clock pulse (CKB=0), the register content read out is stored in temporary memories which are located in the integrated circuits 20 to 23. For this the signal OSN is used, which is identical with the clock signal CKB. At the same time in the second half of the clock pulse (CKB=0) the write counter 26, according to its condition, addresses another register in the integrated circuits 20 to 23 in which a new instruction word is to be written. This relationship is also shown in FIG. 3 in line 7. The two counters 26 and 27 operate synchronously, which means that they are continuously supplied with clock pulses, but their counting operation can continue only when a release signal appears on their respective input CEN, which is yet to be described.

The counters 26 and 27 moreover have a RESET input through which they can be cleared.

For the operating procedure described above, the respective outputs $IO_A$, $IO_B$, $IO_C$ and $IO_D$ of the two counters 26 and 27 are brought together in the manner shown in FIG. 1 and are connected jointly with the addressing inputs AO to A3 to the integrated circuits 20 to 23 forming the buffer memory arrangement. The counting outputs of the two counters 26 and 27 may be connected in and disconnected by the signal CKB by way of the respective input OEN.

Counting outputs $Q_A$ to $Q_D$ ar also provided in the two counters 26 and 27 which are separately led to the inputs A1 to A9 of a programmable read only memory (PROM). This read only memory operates as a monitoring circuit and can evaluate the counter condition of the two counters 26 and 27 by the module 16 principle. When for example the counter condition of the write counter 26 is one counting step under the counter condition of the read counter 27, then the read only memory 28 can deliver a signal PUVOL to a storage processor not represented in FIG. 1 which is assigned to the main memory of the data processing unit, which indicates in the logic condition 1 that the buffer memory arrangement is completely filled. The read only memory 28 can moreover deliver a signal FREIG which informs the main computer that the minimum amount of instruction words required for accomplishing an instruction is contained in the buffer memory arrangement. Moreover a signal IFLOK can be fed from the storage processor to the input A9 of the read only memory 28, with which this minimum amount of instruction words required can be set at two different values.

The programming of the read only memory 28 is discussed in more detail below on the basis of FIG. 5.

Figure 2:
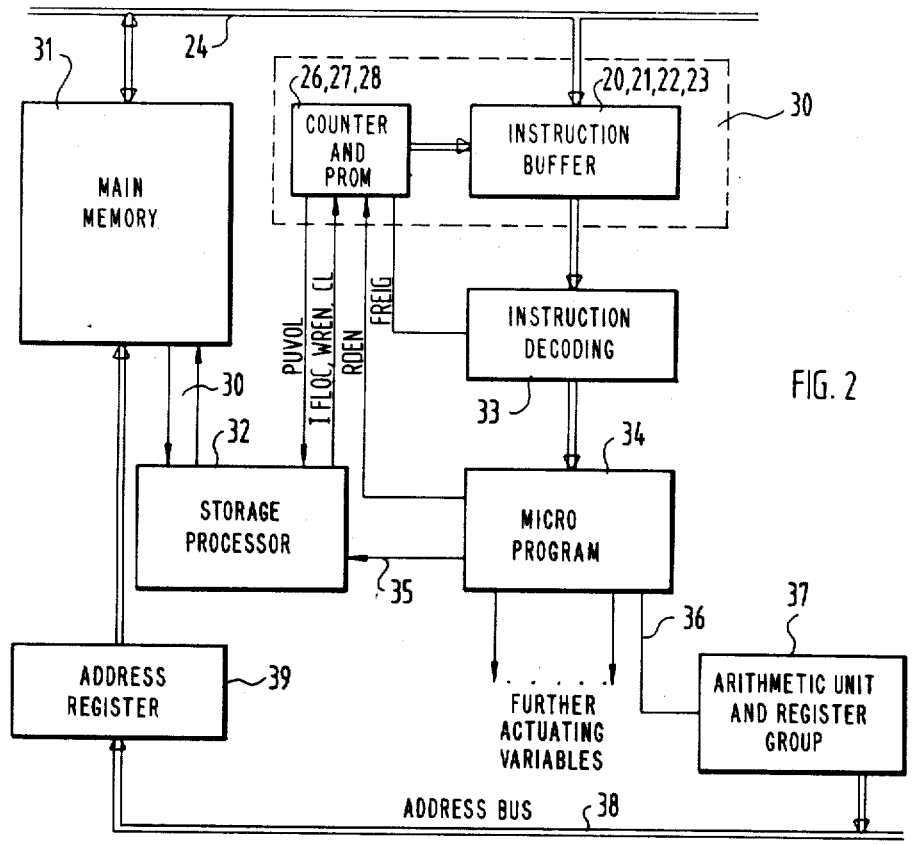
FIG. 2 shows the position of a circuit arrangement according to the invention in a data processing unit in a block representation.

In FIG. 2 are represented the parts of functional units of a data processing unit which are relevant for the use of the invention, with their mutual connections. The circuit arrangement shown in FIG. 1 is designated as a whole as 30 in FIG. 2 and is in connection with the main memory 31 of the processing unit by way of the output bus 24. The main memory 31 may also contain the instruction memory. To this is assigned a storage processor 32 which corresponds with it by way of the connections 30 in a manner known in itself. The storage processor 32 receives the signal PUVOL from the monitoring circuit 28, which signal has already been explained. This processor delivers not only the signal IFLOC and a clear signal CL but also a write release signal WREN to the write counter 26.

An instruction word which is read out of the buffer memory arrangement 20 to 23 reaches an instruction decoding element 33 and is then interpreted by a microprogram 34 which delivers activating variables to its outputs in a manner known in itself. The microprogram corresponds with the storage processor by way of signal lines 34 and delivers a read-release signal RDEN to the read counter 27. Therefore the reading from the buffer memory arrangement 20 to 23 takes place under control of the microprogram 34, while the writing in the buffer memory arrangement 20 to 23 is controlled by the storage processor 32 as a fucntion of the microprogram 34.

The microprogram 34, depending on its sequence, by way of the signal channel 36 controls an arithmetic element with register group, designated in FIG. 2 as 32 as a functional unit. As a function of the operation of the microprogram 34, this unit 37 can then address the main computer 31 by way of an address bus 38 and an address register 39 and bring about other data processing which is of no interest here.

Figure 4:
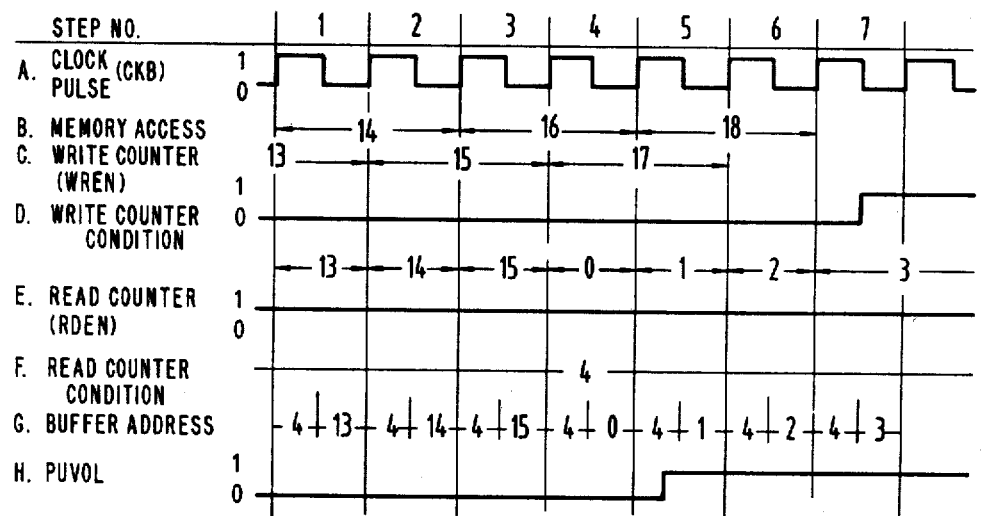
FIG. 4 shows the time sequence of signals in executing an instruction without operand access; and, FIG. 5 shows a table which for two different cases indicates the delivery of monitoring signals through the monitory circuit during the counting operation.

Now that the position of the circuit arrangement shown in FIG. 1 in a data processing unit has been shown on the basis of FIG. 2, the mode of operation relevant here of the data process unit will now be explained further on the basis of FIGS. 3 and 4 for two different cases. For this, FIGS. 3 and 4 show signal sequences within the data processing unit, particularly in the circuit arrangement according to FIG. 1.

In FIG. 3 the time sequence of the operation of the buffer memory arrangement 20 to 23 with its related counters 26, 27 and the monitoring circuit 28 is shown in detail on the basis of the signal sequences. For this it is assumed that the main memory 31 operates with a single overlapping action. The signal sequences in FIG. 3 apply to the initiation of buffer operation after the execution of a jump instruction. The time sequence is divided into individual steps 1 to 12 which correspond to the period of a clock signal SKB, the generation of which is known in itself and therefore is not shown in the figures.

To initiate the buffer operation, the write counter 26 and the read counter 27 must be cleared in order to assume their starting condition. This takes place in step 1 through the logic condition 1 of the clear signal CL, which is fed to the reset inputs of the counters 26 and 27. This signal is represented at C in FIG. 3. It is generated in the storage processor 32, and its appearance also allows access to the first instruction word in the main memory 31 by way of the signal channel 30 through the storage processor 32. This access is represented at B in FIG. 3 and starts with the step 2. The access runs during the steps 2 and 3 and as the first access is designated by 0. The overlapping access to the second instruction word follows during steps 3 and 4, while the access to the third instruction word takes place during steps 4 and 5. These access actions overlapping one another continue up to step 8, with which the access sequence for six instruction words 0 to 5 ends.

The access to the instruction word 0 causes this instruction word to be read out of the main computer 31 during the step 3. As a result of the monitoring of this process by the storage process 32, the latter can cause the signal WREN, which is represented at D in FIG. 3 and starts in the middle of the step 3. This signal, with the rising side of the clock signal CKB represented at A in FIG. 3, causes a stepping action of the write counter 26 by one counting step at the end of the step 3. This alternation of counter condition 0 with counter condition 1 is represented at E in FIG. 3. With this alternation the first instruction word is written in the line 0 of the buffer memory arrangement 20 to 23. Accordingly the second instruction word 1 at the end of the step 4 is written in line 1 and the third instruction word at the end of the step 5 in column 2 of the buffer memory arrangement 20 to 23. Finally, sixth instruction word at the end of the step 8 is written in line 5 of the buffer memory arrangement 20 to 23. This process is represented at J in FIG. 3.

FIG. 3 at H shows the signal FREIG, which is formed at the end of the step 3 and triggers the instruction decoding 33 according to FIG. 2. The first instruction word, contained in line 0 of the buffer memory arrangement 20 to 23, is decoded by having the read counter 27 still stand at counter condition 0. This is shown at G in FIG. 3. The decoding process takes place during the step 4 and is designated as DO for the instruction word 0 and is represented at K. At the same time the signal RDEN is delivered by the microprogram 34 to the read counter 27, whereby the latter is changed over from counting step 0 to counting step 1 at the end of the step 4. In FIG. 3, L represents the microaccess which gives rise to the decoded instruction words. The microprogram 34 then causes the execution of the instructions as shown at M in FIG. 3. This for example it can be seen that the decoded instruction word DO causes the microaccess in line ZOO of the microprogram, whereby in turn the execution EXOO occurs during the step 6. The microprogram 34 then delivers a signal RDEN, whereby the read counter 27 increases its counter condition from 1 to 2 at the end of the step 6. Since no operand access from the main memory 31 occurs after the instruction word DO, the decoding of the instruction 1, that is the second instruction, from line 1 of the buffer memory arrangement 20 to 23 is done during the step 6. In FIG. 3 the decoding D1 of the second instruction word is represented at K. If it is now assumed that the second instruction includes two words, of which the second word in the address for an operand access from the main memory 31, then this is detected during the step 7 in the microaccess Z10 which then follows, and the second word of the instruction from the second line of the buffer memory arrangement 20 to 23 is stored in the address register 30. At the same time a further signal RDEN is delivered, whereby at the end of the step 7 the read counter is switched from the second to the third counting step. In a manner which is not represented, as a result of the operand access the storage processor 32 is informed that no further instruction access is to be started.

For the operand access, the main memory 31 must be addressed. This addressing takes place in step 8, and therefore it is not represented in detail in FIG. 3. The following access to the operand takes place in steps 9 and 10 and is represented at B in FIG. 3. Then with the step 11, as described, an instruction word is again written in the buffer memory arrangement 20 to 23. FIG. 3 shows that as a whole two instruction words are held ready in the buffer memory 20 to 23 before the operand access and two instruction words after the operand access.

FIG. 4 shows a representation similar to that in FIG. 3, but for the execution of a time-consuming instruction which is to be accomplished without any operand access. This may for example involve a multiplication. During this operation the read counter 27 remains unchanged, as shown at E and F in FIG. 4, but the write counter counts further with the incidence on new instruction words, as shown at C and D in FIG. 4. Apart from this the operations take place similarly to what was already described on the basis of FIG. 3.

When the buffer memory arrangement 20 to 23 is filled, as for example may be the case in the step 5, then at this moment the monitoring circuit 28 delivers the signal PUVOL, which is represented at H in FIG. 4. Any further reading out of instruction words from the memory 31 into the buffer memory arrangement 20 to 23 would bring this to overflow. Hence any such reading out in the storage processor 32 is prevented by the signal PUVOL, and the continuing accesses to the 17th and 18th instruction word are concluded. At the end of the steps 5 and 6 the instruction words are written into the lines 1 and 2 of the buffer memory arrangement 20 to 23, and at the end of the step 6 the write counter 26 is stepped for the last time and then shows on line 3 of the buffer memory arrangement 20 to 23. These operations are represented at C and D in FIG. 3.

It may be seen that the signal PUVOL is delivered by the monitoring circuit or the read only memory 28 when the difference between the content of the read counter 27 and the content of the write counter is 1, 2 or 3. The signal PUVOL has a length corresponding to the length of this respective condition.

In FIG. 5 is represented in tabular form how the read only memory must be programmed in order to ensure the mode of operation of the circuit arrangement as described above. For 16 different passes of the modulo 16 write counter or read counter 26 or 27, 256 different memory conditions are required, so that the read only memory 28 must have a total volume of 512 different memory conditions for two different values of the signal IFLOC. Of the 16 possible passes of the write counter 26 or the read counter 27, only four are represented in FIG. 5, wherewith due to the regular structure of the memory content an accurate representation for the passes 5 to 16 is not required.

The tabular representation of FIG. 5 shows respectively the input signals and the output signals of the read only memory 28 for the two different values of the signal IFLOC. The input signals are formed by the signal IFLOC, the count outputs $Q_A$ to $Q_D$ of the write counter 26 and the count outputs $Q_A$ to $Q_D$ of the read counter 27. The output signals are the signals PUVOL and FREIG already described.

As was already explained, the signal IFLOC is delivered by the storage processor 32 and can characterize two different minimum amounts of instruction words required, which must be contained in the buffer memory arrangement 20 to 23 in order for instructions to be able to be accomplished. The left part of the tabular representation in FIG. 5 applies for the case where the signal IFLOC has the logic condition 0, while the right part applies for the case where the signal IFLOC has the logic condition 1.

The left part of the representation in FIG. 5, then, shows that a signal PUVOL with the logic condition 1 will always be delivered when the content of the read counter 27 is greater by one, two or three addresses than the content of the write counter 26. Here the signal FREIG has the logic condition 0 when the contents of the read counter 27 and of the write counter 26 are the same. In all other cases the signal FREIG has the logic condition 1. The release for a further accomplishment of instructions with the logic condition 1 of the signal FREIG also takes place for the logic condition 0 of the signal IFLOC when at least one instruction word is contained in the buffer memory arrangement 20 to 23.

The right part of the representation in FIG. 5 concerns the case where the signal IFLOC has the logic condition 1, when at least two instruction words are contained in the buffer memory arrangement 20 to 23. Here the signal PUVOL likewise has the logic condition 1 when the content of the read counter 27 is greater by one, two or three addresses than the content of the write counter 26. The signal FREIG has the logic condition 0 when the contents of the read counter 27 and of the write counter 26 are greater by one address than the content of the read counter 27. In all other cases the signal FREIG has the logic condition 1. It thus releases the further accomplishment of instructions when at least two instruction words are contained in the buffer memory arrangement 20 to 23.

I claim:

1. Circuit arrangement for the temporary storage of instruction words which are read out of the instruction memory of a data processing unit and are then processed within the course of execution of an instruction, with a temporary memory arrangment which permits the reading out of instruction words at the same time as the execution of instruction words read out previously, characterized in that the temporary memory arrangement provided is one or a plurality of buffer memories (20 to 23) which for writing in and for reading out are addressed by a cyclically operating write counter (26) and a cyclically operating read counter (27), and in that the write counter (26) and the read counter (27) respectively deliver output signals to a monitoring circuit (28) which prevents the read counter (27) from being overtaken by the write counter (26).

2. Circuit arrangement as claimed in claim 1, characterized in that the write counter (26) and the read counter (27) are synchronously timed.

3. Circuit arrangement as claimed in claim 1 characterized in that the monitoring circuit provided is a programmable read only memory (28) which delivers a release signal (FREIG) for the decoding of read out instruction words when a predetermined minimum amount of instruction words is contained in the temporary memory arrangement (20 to 23).

4. Circuit arrangement as claimed in claim 3, characterized in that the read only memory (28) is programmed so that it delivers the release signal (FREIG) only for a prescribed difference beween the contents of the write counter (26) and of the read counter (27).

5. Circuit arrangement as claimed in claim 1 characterized in that the monitoring circuit (28) delivers a signal (PUVOL) indicating the filling of the temporary memory arrangement (20 to 23) to a storage processor (32) connected with the instruction memory (31) when the contents of the write counter (26) and of the read counter (27) differ by a predetermined number of addresses.

* * * * *